United States Patent [19]

McAuliffe

[11] Patent Number: 4,551,667
[45] Date of Patent: Nov. 5, 1985

[54] GAS CONTROLLED BATTERY CHARGING SYSTEM USING A GAS DETECTOR

[75] Inventor: Gerald N. McAuliffe, Lincoln, Nebr.

[73] Assignee: Outboard Marine Corporation, Waukegan, Ill.

[21] Appl. No.: 511,530

[22] Filed: Jul. 7, 1983

[51] Int. Cl.[4] .............................................. H02J 7/04
[52] U.S. Cl. .................................................. 320/46
[58] Field of Search ................................... 320/43, 46

[56] References Cited
U.S. PATENT DOCUMENTS 3,403,317 4/1968 Knight ................................. 320/46
3,683,257 8/1972 Mas ....................................... 320/46

Primary Examiner—Peter S. Wong
Assistant Examiner—Anita M. Ault
Attorney, Agent, or Firm—Michael, Best & Friedrich

[57] ABSTRACT

Voltage is dropped across the variable reistance of a gas responsive sensor to obtain a control voltage which is compared to a ramp waveform reference to cause the comparator to apply pulses to an SCR which supplies corresponding charging pulses to the battery. Another embodiment uses the sensor resistance variation to decrease the current on the base of a transistor which controls the current supplied to the battery.

8 Claims, 5 Drawing Figures

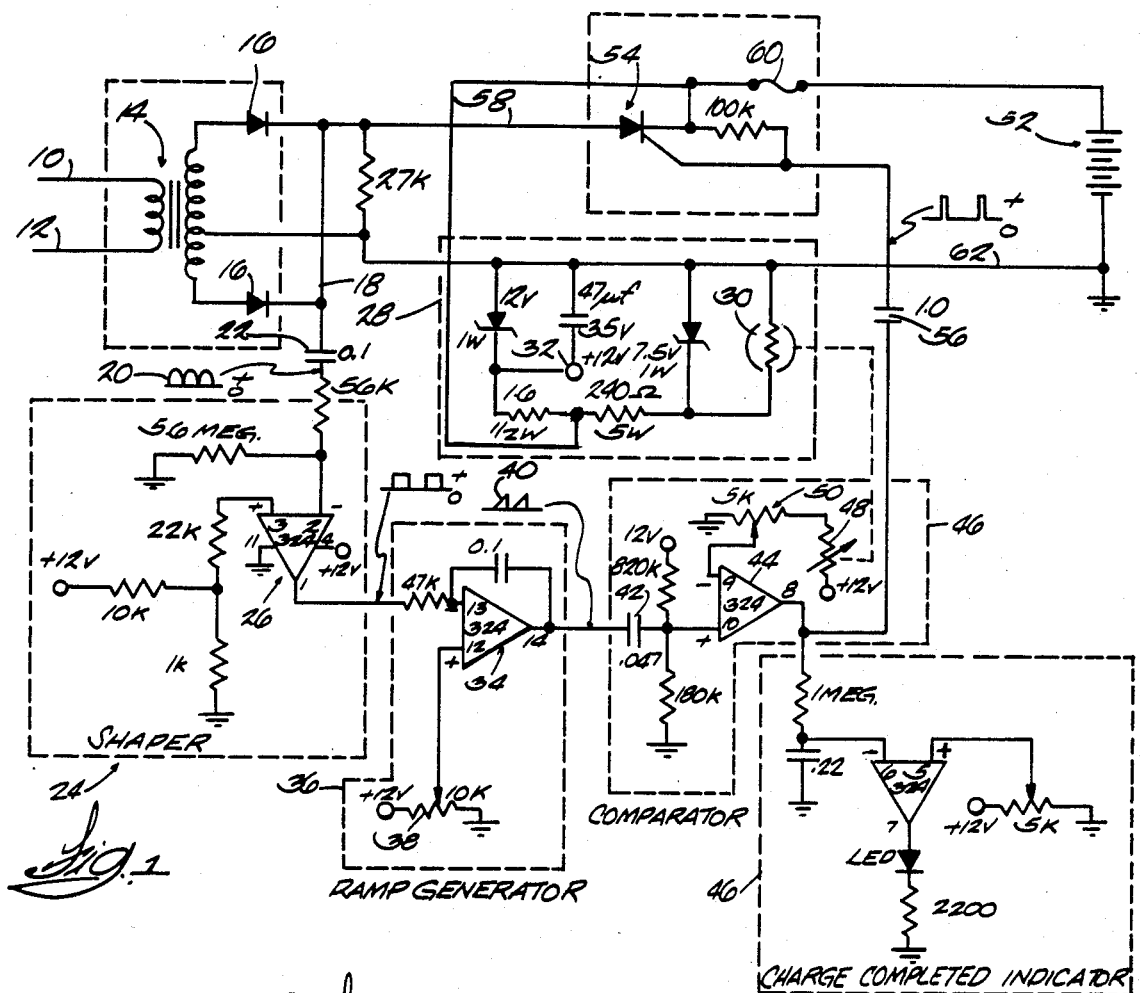
Fig. 1
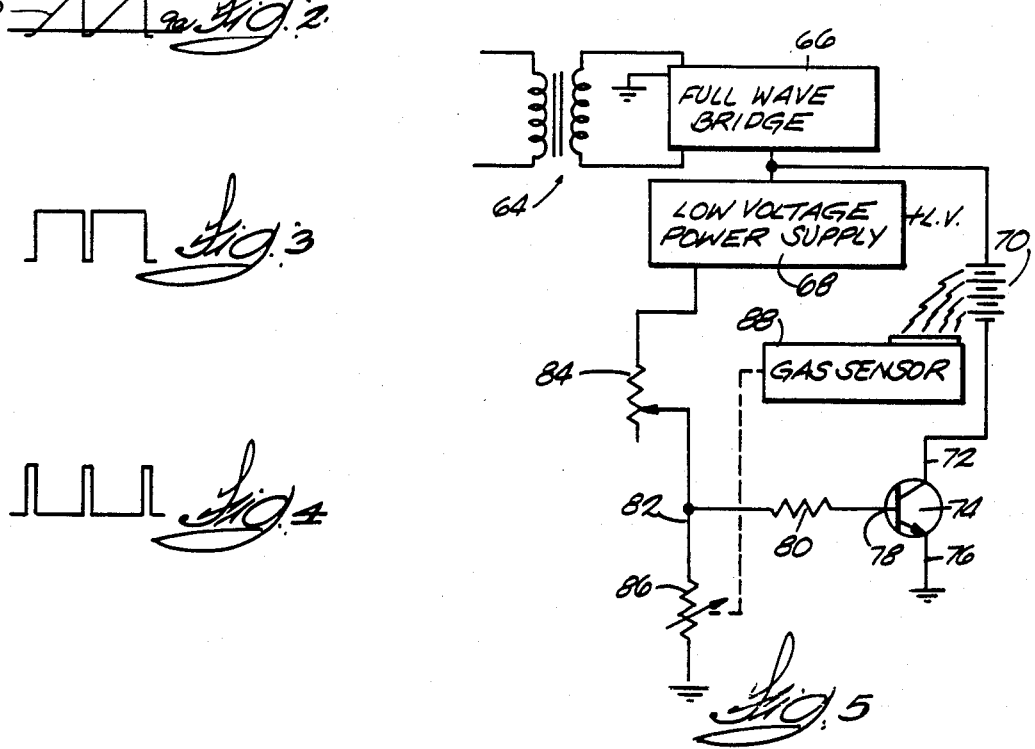
Fig. 2
Fig. 3
Fig. 4
Fig. 5

GAS CONTROLLED BATTERY CHARGING SYSTEM USING A GAS DETECTOR

FIELD OF THE INVENTION

This invention relates to battery chargers and particularly to control of the effective charging rate in response to gassing of the battery under charge.

BACKGROUND OF THE INVENTION

It is well known that the charging current applied to a lead acid battery should be decreased as the battery comes up to full charge. Generally, the decrease has been empirical. Hydrogen gas is evolved as a lead acid battery is charged. This has been suggested as the basis of a method of controlling the charging rate. Prior workers have suggested sensing gas pressure or measuring the noise or vibration caused by the gas bubbles. Those ideas have not been commercialized for obvious reasons.

There is a commercially available smoke/gas detector gased on N-type sintered $SnO_2$. When combustable or reducing gases are absorbed on the sensor surface, a marked decrease of resistance occurs. The decrease is so sharp (it is exponential) that the control is obviously suited to use as a triggering control for various alarms and on-off devices.

SUMMARY OF THE INVENTION

This invention provides a device for controlling charging of a battery which gives off gas when more current is applied than is necessary for charging purposes, the device includes electric circuit means for applying D.C. charging current to the battery and means responsive to gas evolved from the battery to progressively decrease the effective current applied to the battery as the gas concentration increases.

The invention also provides a battery charging control using the resistance change in a control sensing the gas evolved from the battery to cause a progressive decrease in the charging rate as the gas concentration increases.

In the preferred embodiment, voltage is dropped across the variable resistance of a gas responsive sensor to obtain a control voltage which is compared to a ramp waveform reference to cause the comparator to apply pulses to an SCR which supplies corresponding charging pulses to the battery. Another embodiment uses the sensor resistance variation to decrease the current on the base of a transistor which controls the current supplied to the battery. Other circuits are possible. An important aspect is the use of the gas detector to use its great resistance change to cause a progressive change rather than as a trigger for an on-off control or an alarm.

BRIEF DESCRIPTION OF THE DRAWINGS

FIG. 1 is a circuit diagram of a control circuit.

FIG. 2 shows the wave comparison at the two inputs to the comparator stage.

FIGS. 3 and 4 show various output waveforms for the comparator as the input changes with resistance change as the sensed gas concentration changes.

FIG. 5 is a schematic circuit of another embodiment.

This invention is not limited to the details of construction and the arrangement of components set forth in the following description or illustrated in the drawings. The invention is capable of other embodiments and of being practiced and carried out in various ways. Also, it is to be understood that the phraseology and terminology employed herein is for the purpose of description and should not be regarded as limiting.

DETAILED DESCRIPTION OF THE DRAWINGS

The circuit shown in FIG. 1 uses a 324 quad operational amplifier chip available from many sources. The standard numbered connection points (pins) on the chip are numbered (1-14) on the diagram and the connections and circuit components and values are designated in the diagram. Detailed written explanations of the circuit are given herein only where necessary. The circuit diagram also depicts use of a semiconductor gas sensor of the type made by Figaro Engineering Inc. and designated as TGS model 812. The sensor has a large resistance change at low gas concentrations. The response is exponential rather than linear. Each 324 operational amplifier is connected in different circuit arrangements to accomplish different purposes. Dotted lines encircle the generally standard components or circuits of the control.

The alternating current power supply on mains 10, 12 is applied to transformer 14 and the secondary of the transformer has two diodes 16, 16 which are connected together by lead 18 to provide full wave rectified voltage 20 coupled through the 0.1 mfd capacitor 22 to the shaper circuit in the dotted line 24 as shown. The full wave rectified voltage is applied to pin 2 of the 324 operational amplifier 26.

The center tap of the transformer secondary is connected to the input side of the low voltage power supply enclosed in dotted line 28. The power supply provides a regulated peak 7.5 V (RMS approximately 5.3 V) to the heater 30 of the sensor and provides 12 V at 32 which is connected to various points in the circuit including pin 4 on the operational amplifier 26 and pin 3 through the 10K and 22K resistors.

The output of the shaper is a square wave at pin 1 as illustrated. This is applied through a 47K resistance to the input 13 of the 324 operational amplifier 34 in the ramp generator circuit enclosed in dotted line 36. It will be noted 12 V is applied to the 10K potentiometer 38 which is adjusted to adjust the input to pin 12 to adjust the height of the ramp waveform 40 at output 14. The ramp wave is applied through capacitor 42 to pin 10 of operational amplifier 44 in the comparator circuit inside dotted line 46. The comparator circuit compares the voltage at pin 10 to that at pin 9 and the 324 operational amplifier will conduct only when voltage at 10 exceeds that at 9.

The voltage at pin 9 is dependent upon the resistance of the sensor. That resistance varies with the gas concentration at the sensor. The sensor resistance is shown at 48 and is connected by a dotted line to the sensor heater for graphic purposes. The variable sensor resistance has 12 V applied across it and the output is adjusted at potentiometer 50 and the potentiometer output is applied to pin 9. The illustrated 820K and 180K voltage divider on the input to pin 10 raises the low voltage of the ramp waveform to equal the lowest voltage obtainable from the sensor and the 5K potentiometer voltage divider.

FIG. 2 shows the ramp wave 10 applied to pin 10 and shows a horizontal line 9a depicting the low voltage at pin 9 due to the resistance 48 of the sensor being high at the start of charging the battery 52. Therefore, the comparator compares ramp wave 10 to line 9a and will turn on the 324 output at pin 8 when 10 exceeds 9a and will stay turned on until 10 falls below 9a. This will give the output wave shown in FIG. 3. As the battery 52 starts gassing the sensor resistance falls markedly which causes the voltage on pin 9 to rise with the upper limit (before 10 can't exceed 9) shown at 9b in FIG. 2. This would mean 10 exceeds 9 only briefly giving the narrow pulse at output 8 as shown in FIG. 4.

The output at pin 8 is applied through capacitor 56 to the gate of the SCR 54 to cause the SCR to conduct. The SCR is connected to the rectified output of the transformer through lead 58 and the SCR output is connected through fuse 60 to the positive side of battery 52. The negative side of the battery is connected to electrical ground and the lead 62 coming from the center tap of the secondary of the transformer.

When charging is started the charging pulses are wide. As the pin 9 voltage starts rising as the sensor senses gas, the pulse width decreases so the effective applied current decreases. As the gas (hydrogen) concentration keeps increasing, the pulse width keeps decreasing so as to substantially match the ideal charge rate.

As the pulses at pin 8 decrease, the voltage across the 0.22 mdf capacitor on the input pin 6 of the 324 operational amplifier in the charge indicator circuit will decrease. The pin 6 voltage is compared to the voltage at pin 5 which is adjustable at the 5K potentiometer. When the voltage at pin 6 is equal to or less than pin 5 of the output at pin 7 of the 324 operational amplifier turns on and the LED conducts and turns on to indicate the battery charge is completed.

FIG. 5 illustrates a less desireable circuit using the same sensor. Here the output of transformer 64 is applied to the low voltage power supply 68 and to the positive terminal of battery 70. The negative battery terminal is connected to the collector of NPN transistor 74. The transistor emitter 76 is connected to ground while the base 78 is connected through resistor 80 to lead 82 connecting potentiometer 84 (on the output of the low voltage supply 68) to the variable resistance 86 of the gas sensor 88. As the sensor detects gas, the resistance 86 decreases which causes the current on base 78 of the transistor 74 to decrease. This causes the charge current through the battery to decrease. Thus, the charge rate is controlled by changing the base current to the transistor. In effect the transistor is used as a variable resistor. The inherent losses are acceptable for a low current, low cost charger.

The sensor should be positioned to sniff the gas as it is expelled from the battery or several batteries or is exhausted from a battery compartment or as the gas builds up in a battery charging room. One method would be to exhaust the gas from a battery compartment or room with a fan and sniff this gas. The gas concentration must be permitted to build up in some way to given an accurate indication of the degree of charge on the battery. If the expelled gas were to be drawn-off at too fast a rate, it is obvious that the percentage or concentration would build up only very slowly, if at all. Too much air prevents build up of the concentration and too little air lets the gas become too concentrated. The venting of the space and the volume of air added to the space in a given time and other variables require "tuning" the control and vent to the particular set-up.

It will be noted that various adjustments are provided. Thus, in FIG. 1 there is a 10K potentiometer at pin 12 and there is a 5K potentiometer on the input to pin 9 and also on the input to pin 5. These adjustments permit some tuning of the system and allowance for deviation of parts from specifications but may be eliminated in favor of fixed values in production units if sufficient consistency is observed in the various sensors as received by the charger manufacturer. It is thought that these adjustments may continue to be required in production units.

It would be obvious that other circuits could be developed to utilize the marked resistance decrease as the sensed gas concentration increases. In the past, gas sensors of this type have been utilized as triggering devices, but the very marked change in resistance in response to increasing concentration of gas can be used to gradually decrease the effective charging current to a battery with great precision and thus obtain ideal charging conditions without overcharging the battery.

The preferred embodiment changes the effective charging rate by changing the pulse width (time) of constant current value so the effective current in a time base is reduced. This gives the same effect as reducing the current value applied to the battery under charge. Both embodiments change the effective current applied or change the effective charging rate.

I claim:

1. A control for regulating the rate of charge of a battery of the type which evolves a gas when the charging current exceeds that necessary for charging the battery, comprising, electric circuit means for connection to the battery to apply a charging current thereto, a sensor having an electric resistance and responsive to an increasing concentration of gas to progressively change said resistance, means applying a voltage across said sensor resistance to develop an output voltage which varies as the resistance varies, and control means responsive to variation of the output voltage from said sensor to vary the effecting charging current applied to the battery.

2. A control device in accordance with claim 1 in which the sensor is the type which having an N-type $SnO_2$ sensing element the resistance of which changes markedly when a gas is absorbed on the element surface and said control means includes a comparator circuit which compares the output voltage to a reference waveform.

3. A control for regulating the charging rate of a battery which gives off a gas when the charging current exceeds that necessary for charging, comprising, electric circuit means for connection to a battery to apply a charging current thereto, a sensor having an electrical resistance which varies markedly in response to the presence of and to increasing concentration of gas at the sensor, circuit means for applying a voltage across said sensor resistance whereby the output voltage varies markedly with the resistance, and means controlled by the output voltage to decrease the charging rate as the gas concentration increases.

4. A control for regulating the rate of charge of a battery of the type which evolves a gas when the charging current exceeds that necessary for charging the battery, comprising, electric circuit means for connection to the battery to apply a charging current thereto, a sensor having an electric resistance and responsive to an increasing concentration of gas to progressively change said resistance, means applying a voltage across said sensor resistance to develop an output voltage which varies as the resistance varies, and control circuit means including comparator means comparing a reference waveform to said output voltage to provide a control signal, said electric circuit means including means responsive to the control signal to regulate the effective charging rate.

5. A control for regulating the charging rate of a battery which gives off a gas when the charging current exceeds that necessary for charging, comprising, electric circuit means for connection to a battery to apply a charging current thereto, a sensor having an electrical resistance which varies markedly in response to the presence of and to increasing concentration of gas at the sensor, said circuit means including a transistor and means applying a voltage across said sensor resistance to decrease the current on the base of the transistor when the sensor resistance decreases whereby the current applied to the battery decreases as the evolved gas concentration increases.

6. A device for controlling charging of a battery which gives off gas when more current is applied than is necessary for charging purposes, said device comprising means for generating a fixed control ramp waveform, electric circuit means for applying D.C. charging current to the battery, means including a resistance which changes as the gas concentration changes and connected in said circuit means for developing a control voltage varied by said resistance to progressively decrease the effective current applied to the battery as the gas concentration increases, and a comparator circuit comparing said control voltage and said ramp waveform and having an output signal which, when the ramp waveform exceeds the control voltage from the gas responsive means, causes said circuit means to apply the charging current to pass current to the battery.

7. A control for regulating the rate of charge of a battery of the type whih evolves a gas when the charging current exceeds that necessary for charging the battery, said control comprising means for generating a reference waveform, a sensor having an electric resistance and responsive to an increasing concentration of gas to progressively change said resistance, means applying a voltage across said sensor resistance to develop an output voltage which varies as the resistance varies, control circuit means including comparator means comparing said reference waveform to said output voltage to provide a control signal, and electric circuit means for connection to the battery to apply a charging current thereto, said electric circuit means including means responsive to the control signal to regulate the effective charging rate.

8. A control for regulating the charging rate of a battery which gives off a gas when the charging current exceeds that necessary for charging, said control comprising a sensor having an electrical resistance which varies markedly in response to the presence of and to an increasing concentration of gas at the sensor, electric circuit means for connection to a battery to apply a charging current thereto, said circuit means including a transistor having a base, and means connected to the base of the transistor and applying a voltage across said sensor resistance to decrease the current in the base of the transistor as the sensor resistance decreases so that the current applied to the battery decreases as the evolved gas concentration increases.

* * * * *